US009774477B2

(12) United States Patent
Kuo et al.

(10) Patent No.: US 9,774,477 B2
(45) Date of Patent: Sep. 26, 2017

(54) EQUALIZING APPARATUS AND SOFT DECISION METHOD

(71) Applicant: MStar Semiconductor, Inc., Hsinchu Hsien (TW)

(72) Inventors: Chih-Cheng Kuo, Hsinchu Hsien (TW); Wen-Chieh Yang, Hsinchu Hsien (TW); Tai-Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/213,553

(22) Filed: Jul. 19, 2016

(65) Prior Publication Data

US 2017/0163453 A1 Jun. 8, 2017

(30) Foreign Application Priority Data

Dec. 2, 2015 (TW) ............................ 104140246 A

(51) Int. Cl.

| | |
|---|---|
| ***H03H 7/30*** | (2006.01) |
| ***H04L 25/03*** | (2006.01) |
| ***H04L 12/26*** | (2006.01) |

(52) U.S. Cl.

CPC ...... *H04L 25/03949* (2013.01); *H04L 43/028* (2013.01); *H04L 2025/0342* (2013.01)

(58) Field of Classification Search

CPC .................. H04L 25/03057; H04L 2025/0349

USPC .................. 375/233, 229, 232; 708/322, 323

See application file for complete search history.

(56) References Cited

U.S. PATENT DOCUMENTS

2004/0013190 A1* 1/2004 Jayaraman ........ H04L 25/03057 375/233

2006/0256849 A1* 11/2006 Tseng ................. H04L 25/0307 375/232

FOREIGN PATENT DOCUMENTS

TW 200740155 A 10/2007

* cited by examiner

*Primary Examiner* — Khai Tran

(74) *Attorney, Agent, or Firm* — Edell, Shapiro & Finnan, LLC

(57) ABSTRACT

An equalizing apparatus includes a feedforward filter, a soft slicer and a feedback filter. The feedforward filter processes an input signal. The soft slicer performs a soft decision according to an input signal of the feedforward filter and a feedback signal of the feedback filter to generate a decision result signal. The feedback filter generates the feedback signal according to the decision result signal.

12 Claims, 4 Drawing Sheets

100
x(n)
1051
encoding circuit
y(n)
h(n)
w(n)
z(n)
channel estimation circuit
120
125
equalizing apparatus
130
decoding circuit
x'(n)
105
110
115

EQUALIZING APPARATUS AND SOFT DECISION METHOD

This application claims the benefit of Taiwan application Serial. No. 104140246, filed Dec. 2, 2015, the subject matter of which is incorporated herein by reference.

BACKGROUND OF THE INVENTION

Field of the Invention

The invention relates in general to an equalizer, and more particularly to an equalizing apparatus and a corresponding soft decision method.

Description of the Related Art

In general, an equalizer structure at a receiver of a conventional communication system adopts a hard decision mechanism, which determines which symbol a received signal is through a decision boundary and outputs a corresponding signal level. However, a hard decision mechanism suffers from certain severe drawbacks. For example, once a decision error occurs (e.g., due to excessive channel noise or multipath fading), a large amount of decision errors accumulated may undesirably affect subsequent decisions, leading to the overall system being prone to breakdown and instability.

SUMMARY OF THE INVENTION

It is an object of the present invention to provide an equalizing apparatus that performs soft decision and a corresponding soft decision method to solve the issue of a large amount errors accumulated due to a previous decision error of a conventional hard decision mechanism.

According to an embodiment of the present invention, an equalizing apparatus is provided. The equalizing apparatus includes a feedforward filter, a soft slicer and a feedback filter. The feedforward filter processes an input signal. The soft slicer performs a soft decision according to an output signal of the feedforward circuit and a feedback signal of the feedback filter to generate a decision result signal. The feedback filter generates the feedback signal according to the decision result signal.

According to another embodiment of the present invention, a soft decision method applied to an equalizing apparatus is provided. The soft decision method includes: processing an input signal by a feedforward filter; performing a soft decision according to an output signal of the feedforward filter and a feedback signal of a feedback filter to generate a decision result signal; and generating the feedback signal according to the decision result signal by the feedback filter.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
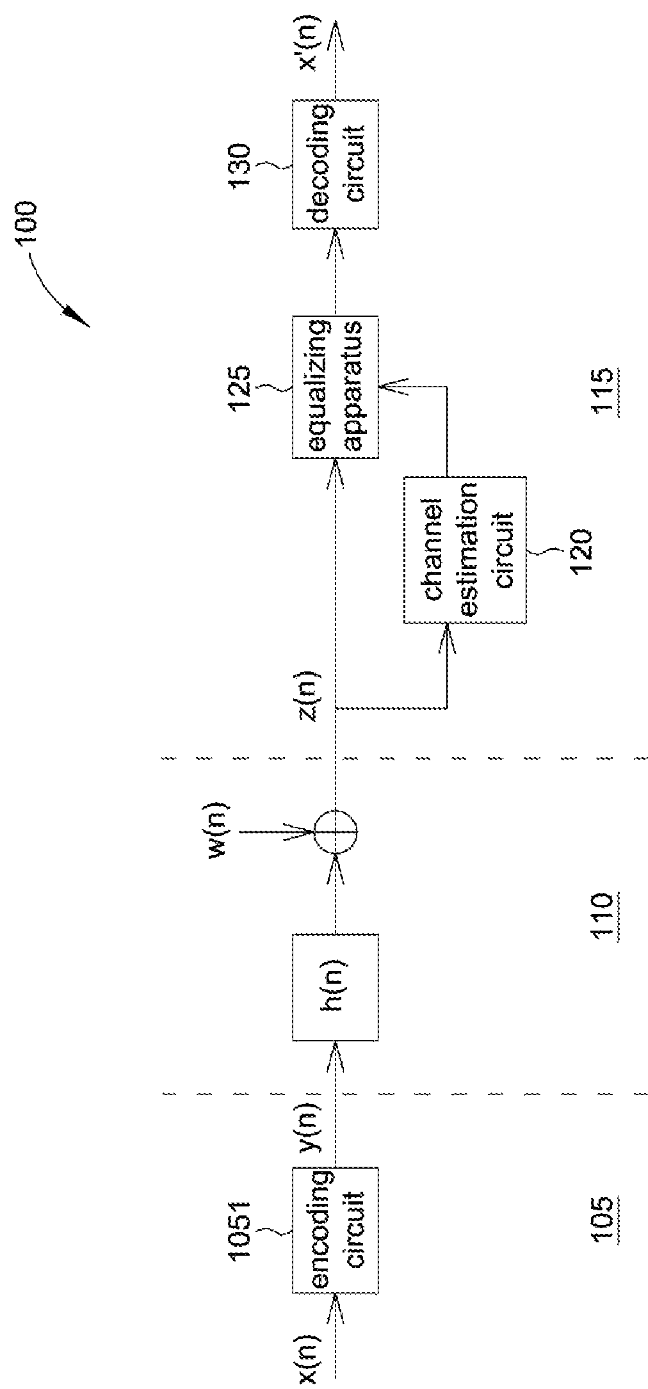
FIG. 1 is a schematic diagram of a communication system according to an embodiment of the present invention.

FIG. 1 shows a schematic diagram of a communications system 100 according to an embodiment of the present invention. The communication system 100 includes a transmitter 105, a channel 110 and a receiver 115. The receiver 115 includes a channel estimation circuit 120, an equalizing apparatus 125, and a decoding circuit 130. The transmitter 105 performs coded protection (e.g., forward error correction (FEC) coding) on an information signal x(n) to generate an encoded signal y(n), and transmits the encoded signal y(n) to the channel 110. The signal y(n) is affected by multipath fading of the channel 110 and additional noise w(n), and so the signal that the receiver 115 actually receives is represented by z(n). Due to the complexity of multipath fading (particularly severe in a wireless communication environment), the information signal x(n) cannot be obtained directly based on the signal z(n). Thus, the channel estimation circuit 120 performs channel estimation to estimate a channel impulse response (CIR), and outputs the CIR to the equalizing apparatus 125. The equalizing apparatus 125 performs response compensation for the multipath fading for the signal z(n) according to the channel estimation result to reduce the transmission error rate. The decoding circuit 130 then decodes the compensated signal (e.g., FEC decoding) to generate or restore a decoded information signal x'(n)'. In the embodiment, during a feedback compensation process, the equalizing apparatus 125 adopts a soft decision method to reduce the issue of error propagation caused by a conventional hard decision mechanism, so as to prevent the issue of more errors resulted from one previous hard decision error from affecting a next decision. Therefore, compared to a hard decision mechanism, the equalizing apparatus 125 adopting a soft decision method provides a higher stability while enhancing the system decision performance.

Figure 2:
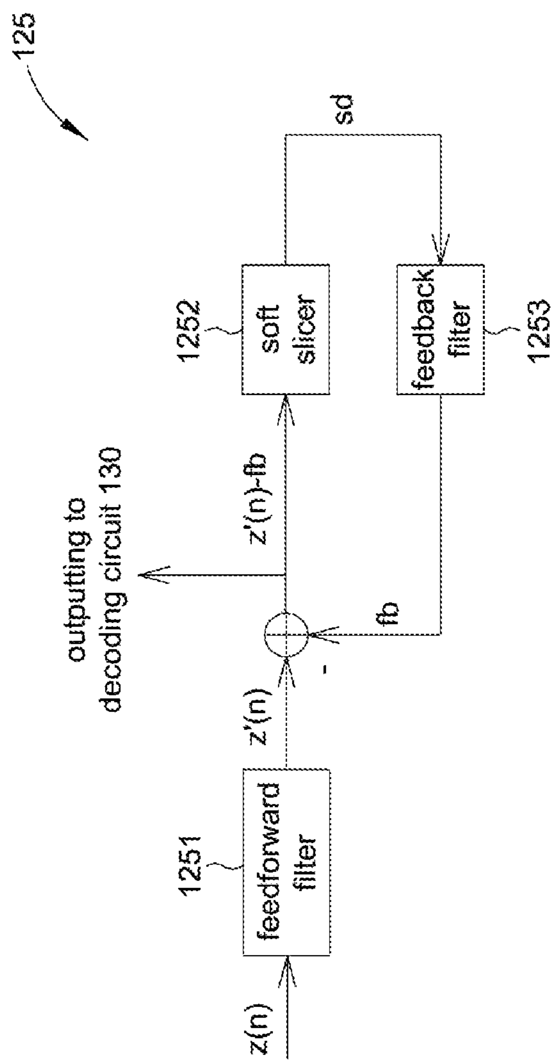
FIG. 2 is a schematic diagram of an equalizing apparatus located at a signal receiver in a communication system in FIG. 1 according to an embodiment of the present invention.

FIG. 2 shows the equalizing apparatus 125 located in a signal receiver of the communications system 100 in FIG. 1 according to an embodiment of the present invention. The equalizing apparatus 125 of the present invention adopts a decision feedback equalizer structure and is suitable in many communication structures, e.g., Digital Video Broadcasting over Cable (DVB-C), Advanced Television System Committee (ATSC), and Digital Terrestrial Multimedia Broadcast (DTMB). The equalizing apparatus 125 includes a feedforward filter 1251, a soft slicer 1252 and a feedback filter 1253. The feedforward filter 1251 receives and processes the signal z(n) actually received from the channel 110. Ideally, the signal z(n) corresponds to a modulated symbol signal at the transmitter, and is affected by multipath fading and noise when transmitted. For example, the symbol may be generated by the transmitter through 16 quadrature amplitude modulation (16-QAM), and the signal level of the signal z(n) ideally corresponds to the amplitude of the 16-QAM modulated symbol signal. The soft slicer 1252, coupled to the output end of the feedforward filter 1251, receives an output signal of the feedforward filter 1251 (i.e., the signal z'(n) processed by the feedforward filter 1251) and the feedback signal fb of the feedback filter 1253, and performs a soft decision according to the output signal z'(n) of the feedforward filter 1251 and the feedback signal fb of the feedback filter 1253 to generate a decision result signal sd. In practice, the signal z'(n) is subtracted by the feedback signal fb (i.e., z'(n)-fb) and transmitted to the soft slicer 1252 to form the input signal of the soft slicer 1252. Alternatively, the soft slicer 1252 may first receive the signal z'(n) and the feedback signal fb, subtract the signal z'(n) by the feedback signal fb by an operation of an internal circuit, and then perform the soft decision. For example, according to the actual signal amplitude of the signal z'(n) processed by the feedforward filter 1251 and the level of the feedback signal fb, the soft slicer 1252 determines to which symbol signal the signal z(n) corresponds, and outputs the ideal level of QAM corresponding to the symbol signal. It should be noted that, the equalizing apparatus 125 of the present invention is suitable for different modulation mechanisms, and is not limited to 16-QAM.

Figure 3:
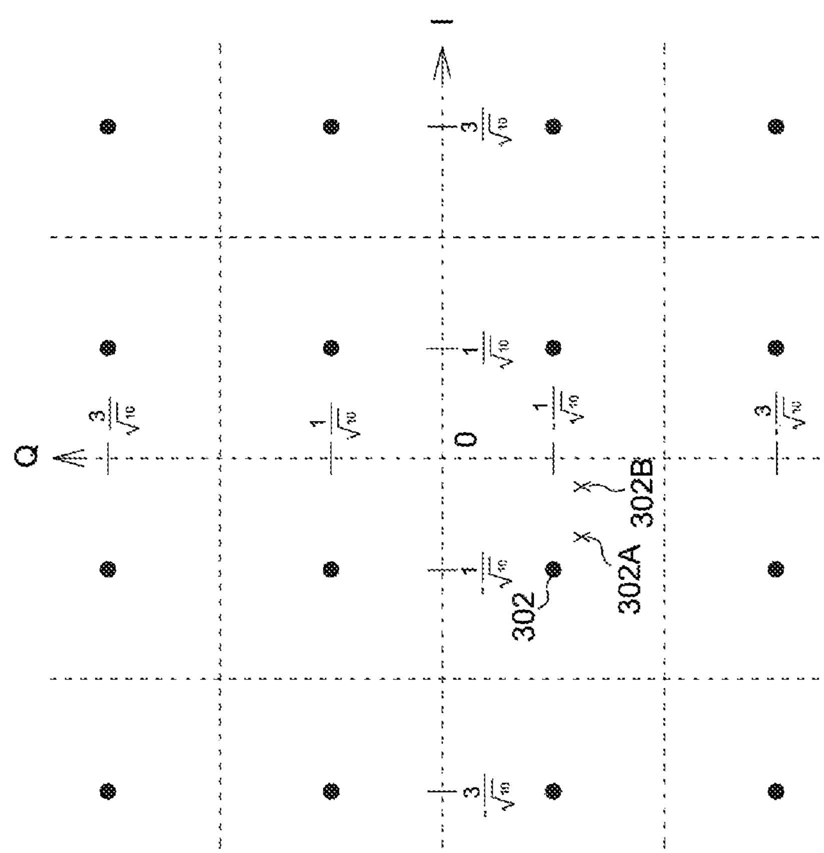
FIG. 3 is a schematic diagram of a constellation diagram and 16 constellation points corresponding to 16 quadrature amplitude modulation (16-QAM)

FIG. 3 shows a schematic diagram of a constellation diagram and constellation points corresponding to 16-QAM that transmits information/data by quadrature amplitude modulation of two quadrature carriers. From the perspective of a signal, two different quadrature carriers are mathematically represented as I+jQ. As shown in FIG. 3, the I axis represents the real number axis of the constellation diagram, and the Q axis represents the imaginary number axis. In the constellation diagram, constellation points of 16 candidate symbols are formed, and the position of the ideal amplitude of the signal z(n) received is expected to fall at one of these constellation points. However, due to the effects of multipath fading and noise, the actual position of the signal amplitude of the quadrature carriers of the signal z(n) may not necessarily fall at the position of a certain constellation point of these 16 constellation points, but may be located near a certain constellation point (if the effects of multipath fading and noise are less significant) or located between two constellation points (if the effects of multipath fading and noise are quite significant). In FIG. 3, the dotted lines represent decision boundaries of the constellation points. If the position of the signal amplitude (or level) of the signal z(n) on the I axis and Q axis is relatively close to a certain constellation point, the soft slicer 1252 of the equalizing apparatus 100 of the present invention achieves determining or correcting the amplitude of the signal z(n) on the I axis and Q axis to be the signal amplitude of the constellation point. Further, to prevent the issue of error propagation, when the soft slicer 1252 detects that the position of the signal amplitude of the signal z(n) is located near the decision boundaries, the soft slicer 1252 performs an adaptive soft decision mechanism. Instead of determining or correcting the signal amplitude of the signal z(n) to be the signal amplitude of a certain near constellation point, a soft decision result signal is generated and outputted to the feedback filter 1253 to prevent the issue of error propagation. For example, if the signal amplitude of the signal z(n) falls at the position of 302A, the soft slicer 1252 achieves determining or correcting the signal amplitude of the signal z(n) to be closest to the amplitude of the constellation point 302

$$\left(\text{i.e., } \frac{-1}{\sqrt{10}} + j \times \frac{-1}{\sqrt{10}}\right).$$

Figure 4:
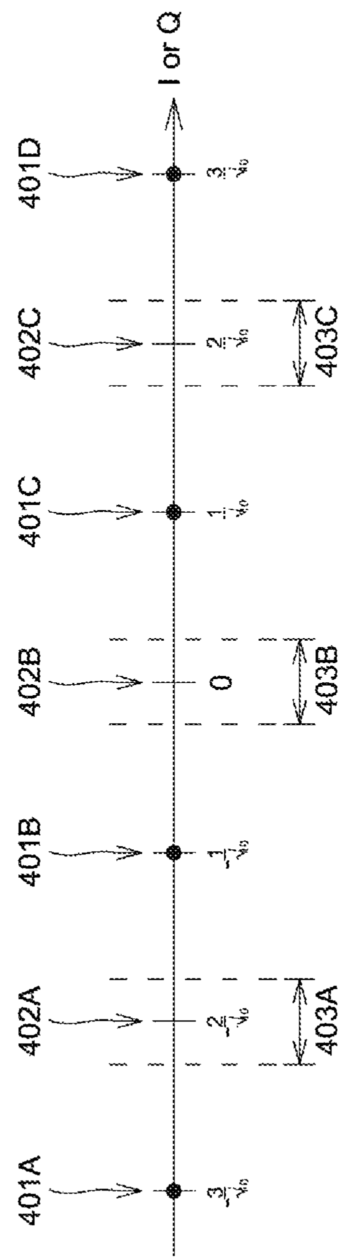
FIG. 4 is a schematic diagram of performing a soft decision according to an embodiment of the present invention.

If the position of the signal z(n) (e.g., 302B) is extremely close to the decision boundaries, instead of determining or correcting the signal z(n) to be the amplitude to the constellation point 302, the soft slicer 1252 outputs a signal level/amplitude different from the positions of the constellation points. Refer to FIG. 4 for actual operation details.

FIG. 4 shows a schematic diagram performing a soft decision according to an embodiment of the present invention. As shown in FIG. 4, the horizontal axis represents the real number axis (I axis) and/or the imaginary number axis (Q axis). FIG. 4 depicts four constellation points 401A, 401B, 401C and 401D, and three corresponding decision boundaries 402A, 402B and 402C, with each of the decision boundaries being between two of the constellation points. For each decision boundary, the soft slicer 1252 provides a corresponding soft decision interval (a signal level interval), e.g., the soft decision intervals 403A, 403B and 403C, with the decision boundaries being respectively located at the center of the soft decision intervals 403A, 403B and 403C. In practice, when performing the soft decision, the soft slicer 1252 determines the position of the signal combination (z'(n)-fb) of the signal z'(n) and the feedback signal fb. Thus, the soft slicer 1252 achieves determining the position of the signal amplitude of the signal z(n) on the I axis and the Q axis, and determining whether the signal amplitude of the signal combination of subtracting the signal z'(n) processed by the feedforward filter 1252 by the feedback signal fb falls in a soft decision interval corresponding to a decision boundary to generate the decision result signal, e.g., determining whether the signal amplitude falls in the soft decision interval 403A corresponding to the decision boundary 402A. When the signal amplitude falls in the soft decision interval 403A, the soft slicer 1252 generates an outputs a corresponding signal level in the soft decision interval 403A as the decision result signal. Conversely, when the signal amplitude falls outside the soft decision interval 403A, the soft slicer 1252 generates and outputs a carrier amplitude level of a corresponding adjacent candidate symbol (i.e., an adjacent constellation point) as the decision result signal. In one embodiment, when the signal amplitude falls in the soft decision interval 403A, the soft slicer 1252 may output the output signal level of the soft slicer 1252 (i.e., the result of the signal z'(n) processed by the feedforward filter 1251 subtracted by the feedback signal fb) as the decision signal sd that is then sent to the feedback filter 1253. Further, in other embodiments, when the signal amplitude falls in the soft decision interval 403A, the soft slicer 1252 may switch to output a signal level corresponding to a central position of the soft decision interval 403A as the decision result signal sd, i.e, outputting the signal amplitude level $$\left(\text{i.e., } \frac{-2}{\sqrt{10}}\right)$$

corresponding to the decision boundary 402A as the decision result signal sd. When the signal amplitude is located outside the soft decision interval 403A to be closer to the constellation point 401A, the soft slicer 1252 generates and outputs a carrier amplitude level $$\left(\text{i.e., } \frac{-3}{\sqrt{10}}\right)$$

of an adjacent candidate symbol (the symbol corresponding to the constellation point 401A) as the decision result signal sd. Conversely, when the signal amplitude is closer to the constellation point 401B, the soft slicer 1252 generates and outputs a carrier amplitude level $$\left(\text{i.e., } \frac{-1}{\sqrt{10}}\right)$$

of an adjacent candidate symbol (the symbol corresponding to the constellation point 401B) as the decision result signal. Determination operations of the soft slicer 1252 for other decision boundaries and corresponding soft decision intervals are identical to those described above, and shall be omitted herein.

It should be noted that, when adopting the above soft decision intervals 403A, 403B and 403C, the soft slicer 1252 may first perform soft decision on the horizontal axis (the real number axis/I axis) of the constellation diagram and then perform the soft decision on the vertical axis (the imaginary number axis/Q axis) according to the soft decision result of the real number axis/I axis to generate the decision result signal sd. Alternatively, the soft slicer 1252 may first perform soft decision on the vertical axis (the imaginary number axis/Q axis) of the constellation diagram and then perform the soft decision on the horizontal axis (the real number axis/I axis) according to the soft decision result of the imaginary number axis/Q axis to generate the decision result signal sd. Alternatively, the soft slicer 1252 may perform the soft decision simultaneously on the horizontal axis (the real number axis/I axis) and the vertical axis (the imaginary number axis/Q axis) to generate the decision result signal sd. Variations above are encompassed within the scope of the present invention.

In a conventional hard decision mechanism, for example, when a symbol corresponding to a carrier amplitude level of $$\frac{-3}{\sqrt{10}}$$

is misjudged as a symbol of an amplitude level of $$\frac{-1}{\sqrt{10}},$$

the amount of error caused by the misjudgment is $$\frac{2}{\sqrt{10}}.$$

Further, not only an error of a conventional hard decision mechanism may cause malfunction of the feedback filter, but also the amount of errors accumulated may further erroneously update the parameters of the equalizer. As opposed to the above conventional hard decision mechanism, when the soft decision approach of the equalizing apparatus 125 of the present invention is adopted, the probability of symbol misjudgment is lowered, and the amount of errors caused by misjudgment may be as low as $$\frac{1}{\sqrt{10}},$$

hence enhancing the system performance. Through the design of soft decision intervals and the decision making approach of the present invention, when the equalizing apparatus 125 of the present invention performs soft decision feedback response compensation, the issue of error propagation of more errors caused by one previous decision error that may further affect a next decision can be eliminated or alleviated. Therefore, the system is provided with a high stability, and is unlikely to breakdown even in the presence of excessive multipath fading.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An equalizing apparatus, comprising:

a feedforward filter, processing an input signal;

a soft slicer, coupled to the feedforward filter, performing a soft decision according to an output signal of the feedforward filter and a feedback signal to generate a decision result signal; and a feedback filter, coupled to the soft slicer, generating the feedback signal according to the decision result signal, wherein the output signal of the feedforward filter and the feedback signal of the feedback filter form an input signal of the soft slicer, and the soft slicer determines whether the input signal of the soft slicer falls in a soft decision interval corresponding to a decision boundary when performing the soft decision to generate the decision result signal.

2. The equalizing apparatus according to claim 1, wherein when the input signal of the soft slicer falls in the soft decision interval, the soft slicer generates a signal level corresponding to the soft decision interval as the decision result signal, and when the input signal of the soft slicer is located outside the soft decision interval, the soft slicer generates a signal level of an adjacent candidate symbol corresponding to the input signal of the soft slicer as the decision result signal.

3. The equalizing apparatus according to claim 2, wherein the signal level corresponding to within the soft decision interval is a level of the input signal of the soft slicer.

4. The equalizing apparatus according to claim 2, wherein the decision boundary is located at a central position of the soft decision interval, and the signal level corresponding to within the soft decision interval is a signal level corresponding to the central position of the soft decision interval.

5. The equalizing apparatus according to claim 2, wherein the equalizing apparatus adopts a quadrature amplitude modulation (QAM) structure, and the soft slicer first adopts the soft decision interval and performs the soft decision on a first axis of a corresponding constellation diagram, and then adopts the soft decision interval and performs the soft decision on a second axis of the corresponding constellation diagram to generate the decision result signal.

6. The equalizing apparatus according to claim 2, wherein the equalizing apparatus adopts a quadrature amplitude modulation (QAM) structure, and the slicer adopts the soft decision interval and simultaneously performs the soft decision on the first axis and the second axis of the corresponding constellation diagram to generate the decision result signal of the soft slicer as the decision result signal.

7. A soft decision method applied to an equalizing apparatus, comprising:

processing an input signal by a feedforward filter;

performing a soft decision according to an output signal of the feedforward filter and a feedback signal to generate a decision result signal; and generating the feedback signal according to the decision result signal by a feedback filter, wherein the output signal of the feedforward filter and the feedback signal of the feedback filter form an input signal of the soft slicer, and the step of performing the soft decision to generate the decision result signal comprises:

generating the decision result signal according to whether the input signal of the soft slicer falls in a soft decision interval corresponding to a decision boundary.

8. The soft decision method according to claim 7, wherein the step of generating the decision result signal according to whether the input signal of the soft slicer falls in the soft decision interval corresponding to the decision boundary comprises:

when the input signal of the soft slicer falls in the soft decision interval, generating a signal level corresponding to the soft decision interval as the decision result signal; and when the input signal of the soft slicer is located outside the soft decision interval, generating a signal level of an adjacent candidate symbol corresponding to the input signal of the soft slicer as the decision result signal.

9. The soft decision method according to claim 8, wherein the signal level corresponding to within the soft decision interval is a level of the input signal of the soft slicer.

10. The soft decision method according to claim 8, wherein the signal level corresponding to within the soft decision interval is a signal level corresponding to a central position of the soft decision interval, and the decision boundary is located at the central position of the soft decision interval.

11. The soft decision method according to claim 8, the equalizing apparatus adopting a quadrature amplitude modulation (QAM) structure, the soft decision method further comprising:

first adopting the soft decision interval and performing the soft decision on a first axis of a corresponding constellation diagram, and then adopting the soft decision interval and performing the soft decision on a second axis of the corresponding constellation diagram to generate the decision result signal.

12. The soft decision method according to claim 8, the equalizing apparatus adopting a quadrature amplitude modulation (QAM) structure, the soft decision method further comprising:

adopting the soft decision interval and simultaneously performing the soft decision on the first axis and the second axis of the corresponding constellation diagram to generate the decision result signal.

* * * * *